(12) United States Patent
Haun, Jr. et al.

(10) Patent No.: US 9,238,586 B2
(45) Date of Patent: Jan. 19, 2016

(54) FILTER CLEANING METHOD

(75) Inventors: Donald W. Haun, Jr., McLean, VA (US); Wayne Adamson, McLean, VA (US)

(73) Assignee: Alion Science & Technology, McLean, VA (US)

( * ) Notice: Subject to any disclaimer, the term of this patent is extended or adjusted under 35 U.S.C. 154(b) by 572 days.

(21) Appl. No.: 12/591,504

(22) Filed: Nov. 20, 2009

(65) Prior Publication Data

US 2010/0140170 A1    Jun. 10, 2010

Related U.S. Application Data

(60) Provisional application No. 61/193,346, filed on Nov. 20, 2008.

(51) Int. Cl.
*B01D 29/52* (2006.01)
*C02F 1/44* (2006.01)
(Continued)

(52) U.S. Cl.
CPC ............... *C02F 1/44* (2013.01); *B01D 61/147* (2013.01); *B01D 61/22* (2013.01); *B01D 65/02* (2013.01); *B01D 2321/162* (2013.01); *B01D 2321/168* (2013.01); *C02F 1/441* (2013.01); *C02F 1/444* (2013.01); *C02F 2103/08* (2013.01); *C02F 2209/03* (2013.01); *C02F 2303/16* (2013.01); *C02F 2303/20* (2013.01)

(58) Field of Classification Search
CPC .................................................... B01D 61/147
USPC ........................................................ 210/636
See application file for complete search history.

(56) References Cited

U.S. PATENT DOCUMENTS 2,701,790 A    2/1955  Goument
3,974,051 A *  8/1976  Elliott et al. ................... 205/755
(Continued)

FOREIGN PATENT DOCUMENTS

SE    WO-2008039147 A2 *  4/2008  ............... C02F 1/32
WO    2005/070524           8/2005
(Continued)

OTHER PUBLICATIONS

QVF Process Systems Ltd, Technical Information, "Sodium Hypochlorite Production"; 2005. http://www.qvf.co.uk/files/ppae10.pdf.
(Continued)

*Primary Examiner* — Tony G Soohoo
*Assistant Examiner* — Peter Keyworth
(74) *Attorney, Agent, or Firm* — Fox Rothschild LLP; Jeff E. Schwartz (57) ABSTRACT

A method cleans a plurality of filters in parallel, each filter having an inlet side and an outlet side separated by a filter barrier. In an operational phase, water is filtered using a plurality of the filters, by passing the water through the filter. In a cleaning phase, at least one of the filters is cleaned while the other filters are filtering water in the operational phase. Each filter is cleaned by supplying sodium hypochlorite to an inlet side of the filter when the filter is off-line. The inlet side of the filter is allowed to soak in the sodium hypochlorite for at least 30 seconds without the sodium hypochlorite being pressurized through the filter barrier during the soaking process. The filters are cycled through the cleaning phase such that each filter is repeatedly cleaned while other filters are filtering in the operational phase.

17 Claims, 6 Drawing Sheets

(51) Int. Cl.
*B01D 61/14* (2006.01)
*B01D 61/22* (2006.01)
*B01D 65/02* (2006.01)
*C02F 103/08* (2006.01)

(56) References Cited

U.S. PATENT DOCUMENTS

| | | | |
|---|---|---|---|
| 4,032,443 | A | 6/1977 | Ross |
| 4,049,531 | A | 9/1977 | Ban |
| 4,159,929 | A | 7/1979 | Grotheer |
| 4,184,963 | A | 1/1980 | Sternberg |
| 4,203,818 | A | 5/1980 | Greaves |
| 4,329,215 | A | 5/1982 | Scoville |
| 4,434,057 | A | 2/1984 | Marquardt |
| 4,780,303 | A | 10/1988 | Dugua |
| 4,783,246 | A | 11/1988 | Langeland et al. |
| 4,818,412 | A | 4/1989 | Conlan |
| 4,941,971 | A * | 7/1990 | Albright ............ 210/107 |
| 5,139,675 | A | 8/1992 | Arnold et al. |
| 5,254,321 | A | 10/1993 | Jackson |
| 5,262,129 | A | 11/1993 | Terada et al. |
| 5,605,627 | A | 2/1997 | Carlsen et al. |
| 5,647,988 | A | 7/1997 | Kawanishi et al. |
| 6,036,789 | A | 3/2000 | Weibel |
| RE36,914 | E | 10/2000 | Carlsen et al. |
| 6,221,247 | B1 | 4/2001 | Nemser et al. |
| 6,248,243 | B1 | 6/2001 | Farley |
| 6,248,809 | B1 | 6/2001 | Buckley et al. |
| 6,342,163 | B1 | 1/2002 | DeLonge et al. |
| 6,419,823 | B2 | 7/2002 | DeLonge et al. |
| 7,083,726 | B2 | 8/2006 | Watanabe et al. |
| 7,344,645 | B2 | 3/2008 | Beck et al. |
| 7,361,274 | B2 | 4/2008 | Lazaredes |
| 7,491,329 | B2 | 2/2009 | Takeda et al. |
| 7,556,730 | B2 * | 7/2009 | Liao et al. ............ 210/108 |
| 7,674,382 | B2 * | 3/2010 | Musale ............ 210/636 |
| 2001/0050095 | A1 | 12/2001 | Yamada et al. |
| 2002/0011439 | A1 | 1/2002 | Blum et al. |
| 2002/0027111 | A1 * | 3/2002 | Ando et al. ............ 210/791 |
| 2002/0056682 | A1 | 5/2002 | Taniguchi et al. |
| 2003/0004084 | A1 | 1/2003 | Sato et al. |
| 2003/0052068 | A1 | 3/2003 | Lu |
| 2003/0080058 | A1 | 5/2003 | Kimura et al. |
| 2003/0127388 | A1 * | 7/2003 | Ando et al. ............ 210/636 |
| 2004/0016705 | A1 | 1/2004 | Umezawa et al. |
| 2004/0188361 | A1 | 9/2004 | Katsu et al. |
| 2004/0245174 | A1 | 12/2004 | Takayama et al. |
| 2006/0000766 | A1 | 1/2006 | Ji |
| 2006/0006123 | A1 | 1/2006 | Huang et al. |
| 2006/0266705 | A1 | 11/2006 | Janson et al. |
| 2007/0007146 | A1 | 1/2007 | Childers, II et al. |
| 2007/0158278 | A1 | 7/2007 | Deschenes |
| 2007/0215544 | A1 * | 9/2007 | Kando et al. ............ 210/636 |
| 2007/0251831 | A1 | 11/2007 | Kaczur et al. |
| 2008/0067125 | A1 | 3/2008 | Wilkins et al. |
| 2008/0093282 | A1 | 4/2008 | Ukon |
| 2008/0203017 | A1 * | 8/2008 | Zha et al. ............ 210/636 |
| 2009/0000944 | A1 | 1/2009 | Varcoe |
| 2009/0101578 | A1 | 4/2009 | McLeod |
| 2009/0127212 | A1 | 5/2009 | Muller et al. |
| 2009/0145773 | A1 | 6/2009 | Herrington |
| 2009/0261046 | A1 * | 10/2009 | Minnie et al. ............ 210/798 |

FOREIGN PATENT DOCUMENTS

| | | | |
|---|---|---|---|
| WO | WO-2006127579 A2 * | 11/2006 | ............ B01D 65/02 |
| WO | 2007/076611 | 7/2007 | |
| WO | 2007/130851 | 11/2007 | |

OTHER PUBLICATIONS

Casson et al. "Sodium Hyochlorite [sic] Production From Landfill Ash Leachate; Pilot Testing and Full-Scale Application", Water Environment Federation; WEFTEC, 1999. http://www.fuseinc.com/Disinfection/SodiumHypochlorite/default.htm.

PCT/ISA/210, PCT/ISA/220, and PCT/ISA/237 for corresponding International Application No. PCT/US2009/006217, mailed on Sep. 1, 2010.

International Preliminary Report on Patentability, mailed on Jun. 3, 2011.

* cited by examiner

FILTER CLEANING METHOD

CROSS REFERENCE TO RELATED APPLICATIONS

This application is based on and hereby claims priority to U.S. Provisional Application Ser. No. 61/193,346 filed on Nov. 20, 2008, the contents of which are hereby incorporated by reference.

GOVERNMENT LICENSE RIGHTS

The U.S. Government has a paid-up license in this invention and the right in limited circumstances to require the patent owner to license others on reasonable terms as provided for by the terms of Contract No. N65540-06-C0007 awarded by the Department of Defense, Naval Surface Warfare Center Carderock Division—Philadelphia.

BACKGROUND OF THE INVENTION

Microfiltration, ultrafiltration, and nanofiltration of water by membrane modules and other technologies have been employed in various applications where high purity water is required.

There are different degrees of filtration, as well as different types of filter technologies, which are selected and operated in accordance with the material to be separated and the quality required. For example, the microfiltration membrane filter modules can efficiently remove fine particles and microorganisms measuring 10 µm or smaller, particularly 1 µm or smaller, and are therefore commonly used in the purification of potable water supplies and waste water.

One common type of microfiltration module uses a hollow fiber membrane. These hollow fibers can be bound in a cylindrical tube bundle type configuration to maximize filtration surface area while minimizing module volume. An alternative approach is to start with a membrane sheet, fold pleats into the sheet and then arrange the pleated sheet in either a cylindrical configuration or a planar configuration.

Among these approaches, the hollow fiber membrane module enables a large membrane filtration surface area per unit volume and is often preferably used. The hollow fiber-based microfiltration membrane module is routinely used in filtration to remove suspended solids and most bacteria and viruses to produce clear filtered water.

The hollow fiber membrane module is also used in large-scale purification plants having processing capacity over 10,000 m$^3$ per day, in the case of potable water purification. In such an application, a large number of hollow fiber membrane modules are used to secure a large membrane area.

After a period of continuous filtering operation, however, the micropores of the membrane become clogged with debris, resulting in a decrease in flow rate of the filtered water and an increase in the filtration back pressure, thus making it necessary to either perform a major cleaning of the membrane modules or replace them. Frequent major cleaning and especially frequent change of the membrane module is economically disadvantageous.

In order to minimize major cleaning or replacement of filters, less expensive operations to partially restore the filtering function are typically carried out. In the case of an external pressure-driven hollow fiber membrane module, for example, the following processes have been used to partially restore filter function: 1) Backwashing, wherein filtered water is passed in a reverse direction from the inside to the outside of the hollow fiber membrane to dislodge debris; 2) Scrubbing of the fibers' external surfaces, initiated by pneumatically agitating the fluid surrounding the fibers (the combination of air bubbles and fluid stripping debris away from the membrane surfaces); or 3) A combination of these cleaning operations.

While beneficial, these mechanical and backwashing methods are not completely effective in removing all contaminant material and over time their efficacy gradually decreases as the membranes become fouled by material which is not so readily removed by these means. Because of the nature of the material being filtered, which is often surface water, ground water or material passing through membrane bioreactors and the like, the fouling agents are generally biological/organic in nature and also usually contain foulants of an inorganic nature.

Major cleanings typically employ chemical cleaning agents to remove foulants from membrane pores and surfaces. Because of the presence of more than one type of foulant (bio/organic foulants on the one hand, and inorganic foulants on the other), a dual chemical clean is usually required to restore the membrane's performance. An oxidant or caustic agent is used to remove organic foulants, and acids or chelating agents are used to remove inorganic materials fouling the membrane. The two chemical cleanings are carried out in series. This major cleaning process can be done in place, or the filters can be removed for cleaning. In either a clean-in-place or a remove-to-clean operation, the downtime is normally from four hours to two days. For many applications, such lengthy downtimes are cost prohibitive.

One approach to clean membrane modules is to use large quantities of chlorine in a cleaning process performed after the membranes became clogged. This "clean in place" process could take days to complete, was somewhat manual and required disassembly. In addition, it was found to cause significant chlorine dosing. Because chlorinated organic by-products are carcinogenic, the procedure could not be used in a potable water treatment system.

To avoid the potential problems associated with chlorine, this first approach instead proposed to use a monopersulfate cleaning solution. The monopersulfate cleaning solution could be fed into the feed side of hollow fiber membranes, so that membranes could stand and soak in the solution for a desired period, for example, several hours. It was also proposed to inject the monopersulfate cleaning solution to the filtrate side during a backwash mode, or to use the monopersulfate cleaning solution in repeated cycles of backwash and soaking by recirculating the persulfate solution through the membrane or membrane system. In a continuous process, the monopersulfate cleaning solution concentration could be injected immediately upstream of the membrane.

A second approach is to periodically perform a cleaning operation after a pre-determined period of filtration. According to this proposal, the cleaning operation may include scrubbing cleaning performed using air supplied by a blower and backwashing by reversing the flow of filtrate from a backwash tank. During backwashing, sodium hypochlorite would be injected into the backwash water from a chemical tank. With the second approach, scrubbing cleaning or backwashing could be performed alone or scrubbing cleaning and backwashing could be combined. For example, a membrane filtration device could be operated in the sequence of (i) filtration (ii) scrubbing cleaning, (iii) filtration, (iv) backwashing and so forth.

The primary drawback of most backwash operations is that they require significant amounts of filtered product water to be effective and this reduces the overall output of the filtering process. This production penalty becomes even more significant when chemical additives are used in the process since flushes have to be incorporated to ensure the additives do not enter the flow stream.

SUMMARY

The inventors propose a method for cleaning providing a plurality of filters in parallel, each a filter having an inlet side and an outlet side separated by a filter barrier. In an operational phase, water is filtered using a plurality of the filters, by passing the water through the filter, from the inlet side to the outlet side. These filters may be a hollow fiber membrane. In a cleaning phase, at least one of the filters is cleaned while the other filters are filtering water in the operational phase. Each filter is cleaned by supplying sodium hypochlorite to the inlet side of the filter when the filter is off-line. The inlet side of the filter is allowed to soak in the sodium hypochlorite for at least 30 seconds without the sodium hypochlorite being pressurized through the filter barrier during the soaking process. This oxidizes organic contaminates near the surface of the filter. The filters are cycled through the cleaning phase such that each filter is repeatedly cleaned while other filters are filtering in the operational phase.

Soaking in sodium hypochlorite may be employed in every cleaning phase. The sodium hypochlorite may have a concentration of from 10 ppm to 120 ppm. The sodium hypochlorite may be allowed to soak for 30 to 150 seconds during the cleaning phase. Sodium hypochlorite may be used in conjunction with a bromide disinfectant.

Filter cleaning methods such as rinsing, forward flushing, scrubbing and/or back flushing are used in conjunction with soaking in sodium hypochlorite so as to remove particulates and oxidized organic mater from the filter.

Supplying sodium hypochlorite to the inlet side of the filter may involve supplying a less concentrated sodium hypochlorite solution to the inlet side of the filter. To produce the less concentrated sodium hypochlorite solution, a more concentrated sodium hypochlorite solution can be diluted according to a dilution ratio. The method may involve monitoring at least one of pressure drop across the filter and quality of inlet water and remotely changing the dilution ratio based on at least one of pressure drop across the filter and/or quality of inlet water.

Back flushing may be performed for a total time of 10 to 90 seconds per cleaning phase. The operational phase may last from 15 to 40 minutes.

The filter may be used in a process that generates fresh water from seawater. In this case, the sodium hypochlorite may be generated from the seawater. Eliminating particulates, performing desalination, generating sodium hypochlorite and using sodium hypochlorite may all be performed in a self-contained unit.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION

Reference will now be made in detail to the preferred embodiments of the present invention, examples of which are illustrated in the accompanying drawings, wherein like reference numerals refer to like elements throughout.

Figure 1:
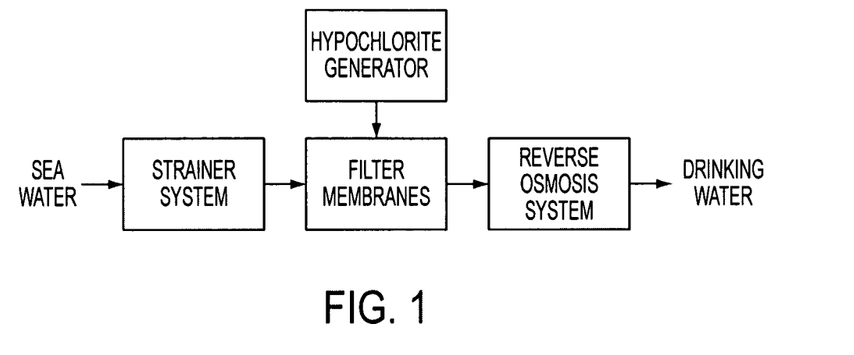
FIG. 1 is a process schematic view of proposed equipment for generating fresh water from seawater.

FIG. 1 is a process schematic of the proposed equipment for generating fresh water from seawater. First, large impurities are strained from the seawater in a strainer system. Then, the strained water is sent to filter membranes to remove substantially all particulate and biological material from the flow stream. A sodium hypochlorite solution is used to clean the filter membranes. The membranes may each be bundles of hollow fibers or other sub-micron filter type. One embodiment includes multiple bundles of perhaps thousands of hollow fibers configured into cylindrical filtering modules. Contaminated feed is supplied under pressure to the outer surface of the fibers and filtered product is drawn from the hollow centers of the fibers. Sodium hypochlorite may be generated in a subsystem which receives filtered water that has been processed by the filter membranes. In order to remove dissolved salts from the micro filtered water, a reverse osmosis system or other desalination method is used, thereby producing fresh water.

The Filters

The filter may be a hollow fiber membrane or other sub-micron level filtering device. Numerous membrane suppliers offer a wide range of products to choose from. One example is a microfiltration PVDF (Polyvinylidene Fluoride) hollow fiber membrane. The hollow fiber membrane is supported by a housing to form a membrane module. A plurality of membrane modules may be operated together/in parallel to form one "filter bank."

In operation, source water is supplied to the filter housing such that the water surrounds the many small hollow fibers that comprise the filter bundle. The water is under pressure and is forced across the fiber walls, and micro filtered water exits from the ends of the fiber bundles. Any suspended particulates larger than a given size are unable to pass through the fiber wall. For example, a membrane with a nominal pore size of 0.04 µm and a maximum pore size of 0.1 µm would stop all particles larger than 0.1 µm and most particles larger than 0.04 µm from passing through the fiber wall. The particulates blocked by the fibers accumulate on the fiber outer surfaces and have to be periodically removed from the system during the cleaning process.

Multiple Banks of Filters

Figure 2:
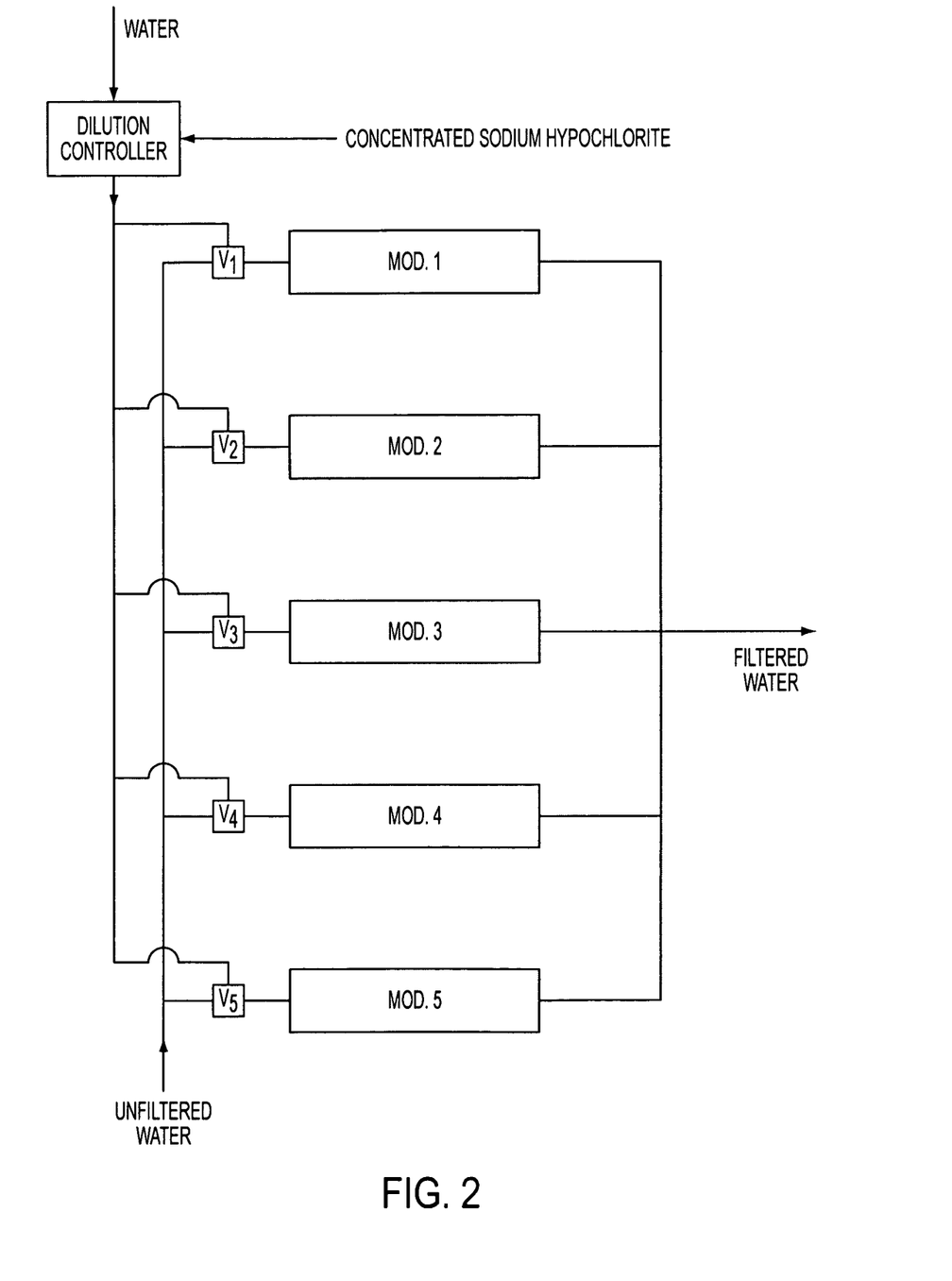
FIG. 2 is a schematic drawing of a plurality of filter membrane modules arranged in parallel.

FIG. 2 shows a plurality of membrane modules being operated in parallel. FIG. 2 shows five filter banks, but there is no limitation regarding the number. Each bank can include one or more membrane modules. According to one embodiment, while one of the modules is being cleaned, the other four modules are filtering water. Valves V1 through V5 are used to selectively supply the modules with either unfiltered water or sodium hypochlorite solution.

Since the filter banks are sequentially rotated in and out of service on a continuous basis, operation of the array may be controlled by a programmable logic controller. Computer monitoring and control ensures that no single bank of membrane filters operates for more than a predetermined time, for example 30 minutes, before it undergoes a cleaning cycle.

The method uses multiple banks of filters, each bank being periodically and independently cycled from an operational phase to a cleaning phase, and back to an operational phase. In the operational phase, source water is filtered using a filter having an inlet side and an outlet side, the water being filtered by passing the water through the filter, from the inlet side to the outlet side. In the cleaning phase, the filter is cleaned by a cleaning process that involves supplying sodium hypochlorite to the inlet side of the filter when the filter is off-line. The sodium hypochlorite is supplied such that the inlet side of the filter is soaked in the sodium hypochlorite without the sodium hypochlorite being pressurized through the filter during the soaking process.

After a soak period of a sufficient length of time and of sufficient sodium hypochlorite concentration to oxidize a significant amount of the organic contaminates on and near the surface of the filter medium, cleaning methods, such as rinsing, forward flushing and back flushing are used to further clean the filter. Flushing the membranes also ensures that residual sodium hypochlorite is not introduced into the filtrate stream. The sodium hypochlorite soaking, and subsequent rinsing and/or flushing processes may be repeated one or more times. The filter is then placed back in the operational phase.

I Operational Phase—Time Between Cleaning

The cleaning and operational phases are repetitively cycled on a fixed periodicity, so that some filters are always operational. The intent is to proactively rather than reactively clean the filters in a sequential manner so as to keep the overall filtration system online for extended periods of time. By cleaning proactively, tests have shown that major filter cleanings can be greatly reduced or eliminated.

While time between cleaning (filtration time) is a function of the incoming raw water quality and the loading or processing rate of the filter, its variability is also constrained by the overall filtration system design. Many variables affect the time between cleaning, making it difficult to determine exactly. Selection of the time between cleaning (filtration time) requires that these variables be weighed against each other to achieve an economical and practical solution.

The time between cleaning, that is the time of each operational phase, according to one embodiment, may be between 7 and 80 minutes, more specifically between 15 and 40 minutes, and still more specifically between 20 and 35 minutes. If the duration of the operational phase is too short, the efficiency of the system is reduced because the percentage of time spent cleaning is unnecessarily high. If the operational phase is too long, the membranes will become clogged with more debris than can be effectively removed in the cleaning phase.

II Cleaning Phase

As mentioned above, the filter banks recycle through operational (filtering) and cleaning phases. Each cleaning phase involves a plurality of steps, including, but not limited to, scrubbing, backwashing and soaking in sodium hypochlorite. These steps are described separately below.

A. Scrubbing and Scrubbing Time

In the cleaning phase, the filters may be physically agitated to remove particles. The external surfaces of the fibers may be scrubbed by pneumatically agitating a fluid around the fibers. The fluid may be a combination of air bubbles and the liquid being filtered. The purpose of the scrubbing operation is to strip debris away from the membrane surfaces. Again, many variables affect selection of the appropriate scrubbing time. The scrubbing time must be long enough to dislodge the particles, but not too long as to reduce the overall operating efficiency of the system. According to one potential embodiment, the scrubbing time may be 20 seconds to 5 minutes, more specifically 30 seconds to 2 minutes, and still more specifically 40 to 100 seconds.

B. Backwashing and Backwash Time

Backwashing can also be performed during the cleaning phase. Backwashing involves passing the filtered water in the reverse direction from the inside to the outside of the hollow fiber membrane. Although the mechanics are different, backwashing is similar scrubbing in that it also results in debris being dislodged. Another function of backwashing is to help remove loose debris from the module housing.

Again, many variables and tradeoffs are involved in selecting the appropriate time spent backwashing. However, according to one potential embodiment, the backwash time may be from 5 to 180 seconds, more specifically from 10 to 90 seconds. If the backwash time is too short, the backwash objectives are not achieved. Since the backwash process involves reversing the flow of filtered water, a backwash time that is too long will waste the filtered water.

In most cases, backwashing is performed by only reversing the flow of filtered water. Because of the highly efficient cleaning process proposed herein, it should not be necessary to introduce chemicals into the backwash water. By avoiding a chemical backwash, it is possible to reduce the supply cost for operating the system. Further, waste disposal problems are reduced. Also, the danger of having backwashed chemicals seep into the filtered water is removed. For example, if sodium hypochlorite were introduced into the backwash water, there is a possibility that residual hypochlorite could be present in the filtered water. This is not a problem if chemical backwashing is avoided.

C. Soaking In Sodium Hypochlorite

1. Soak Time

One of the key aspects of the cleaning phase is supplying sodium hypochlorite to the inlet side of the filter and allowing the inlet side of the filter to soak in the sodium hypochlorite. This step, when used in conjunction with the other cleaning steps, greatly improves the efficiency of the entire process. When the filters are operating, organic material is trapped at the inlet side of the fiber. During the cleaning phase, when the inlet side of the fiber is soaked in sodium hypochlorite, the organic material is neutralized, substantially killing bacteria and viruses.

The soak time is a function of the organic loading on the membrane. Once again, selecting the appropriate soak time involves considering several variables and tradeoffs. According to one potential embodiment, the soak time may be 5 seconds to 3 minutes, more specifically 20 to 150 seconds, and still more specifically 40 to 100 seconds.

It is important to note that the soak time is very different from the scrubbing time and the backwash time. The scrubbing time relates to a physical/dynamic cleaning of the membrane, whereas the soak time relates to a chemical reaction cleaning. The time required for a chemical to react has nothing to do with the agitation time required to dislodge particles. Likewise, the soak time is very different from the backwash time which relates to a dynamic flow reversal step.

2. Chlorine Concentration

As with the other parameters, selecting the appropriate hypochlorite concentration involves considering a plurality of variables and tradeoffs. Generally speaking, if a more concentrated hypochlorite solution is used, the organic material is neutralized more quickly. If the concentration is too low, the organic material will not be removed. If the concentration is too high, energy and resources are wasted on the hypochlorite, and residual hypochlorite could end up in the filtered stream. An additional consideration is that some filter membranes have a maximum tolerance to chlorine concentration during treatment, and an accumulated endurance tolerance over their lifetime. The sodium hypochlorite concentration, the frequency of backwashing and the duration of soaking all impact the lifetime endurance calculation. Once the limit is reached membrane replacement is called for. It is therefore important to keep sodium hypochlorite concentrations to the minimum level necessary for the particular feed stock being filtered.

To determine the organic contamination levels of the inlet water, direct testing methods may be used. Alternatively, organic contamination can be inferred by measuring pressure drop across the filter, however, this method measures both organic and inorganic contaminates, and, while easier to accomplish, is inferior to a direct measurement of organic contamination. The sodium hypochlorite concentration may then be adjusted up or down proportionally, based on the measured (or inferred) inlet water organic contamination.

According to one potential embodiment, the initial hypochlorite concentration (the concentration of the hypochlorite solution as it is being introduced to the inlet side of the membrane) may be from 5 ppm to 150 ppm, more specifically from 10 ppm to 120 ppm, and still more specifically from 25 ppm to 75 ppm.

Although parameters such as the length of the operational phase, the length of the different parts of the cleaning phase and the hypochlorite concentration are usually determined before the system is placed in operation, the needs of the system can change. For example, if the quality of the inlet water suddenly decreases, it is necessary to change the operating parameters to prevent the filter membranes from becoming clogged. One way the inventors propose to achieve this goal is by allowing the sodium hypochlorite concentration to be varied at the start of the soak cycle. For example, highly concentrated sodium hypochlorite can be stored in one or more storage tanks. Then, before the sodium hypochlorite is supplied to the inlet side of the membrane, it is diluted to the appropriate concentration. See FIG. 2. If there is a need to dynamically change the cleaning operation, the concentration can be varied. For example, if the quality of the inlet water suddenly decreases, the sodium hypochlorite concentration can be increased to compensate for the additional contaminants. To do this, the dilution ratio of the concentrated sodium hypochlorite is simply decreased.

If sodium hypochlorite is supplied to the inlet side at the proper concentration, all of the sodium hypochlorite can be consumed during the soak period before any reaches the backside of the membrane. Soaking the inlet side of the fibers in sodium hypochlorite is completely different from backwashing using sodium hypochlorite. One of the key benefits of soaking the inlet side in sodium hypochlorite is to avoid/minimize the possibility of sodium hypochlorite being introduced into the filtered water.

3. Relationship between Variables

The amount of organic contaminant removal required is proportional to the amount of clogging. The amount of clogging depends on the flow rate per area of fibers (flux rate across the membranes), the input quality of the raw water being filtered and the length of time the filter is operated between cleaning cycles. In turn, the amount of organic contaminant removed depends on the sodium hypochlorite concentration and the time during which the inlet side of the membrane is allowed to soak in the sodium hypochlorite. Sodium hypochlorite (chlorine) concentration used for the inlet soak may be adjusted to compensate for changes in conditions of the inlet water quality. Such changes may be due to seasonal changes, movement of the filtration equipment to alternate locations or other factors.

4. Desalination & Generating Sodium Hypochlorite from Seawater

The sodium hypochlorite used for cleaning may be generated from seawater or supplied from an external source. If generated from seawater, the sodium hypochlorite may be produced by passing seawater through a hypochlorinator to produce a sodium hypochlorite solution. The concentration of sodium hypochlorite in the hypochlorite solution may be increased by recirculating the hypochlorite solution through the hypochlorinator until a desired concentration level is reached. The benefit of generating hypochlorite rather than using commercially available hypochlorite is that the "freshness" or concentration of the solution is assured since hypochlorite decays over time. Additionally, generating sodium hypochlorite avoids the expense and necessity of stocking this hazardous chemical.

Substantially the entire prefiltration process of sequential particulate removal micro filtering, generating sodium hypochlorite and using sodium hypochlorite may be performed in a self-contained unit.

The hypochlorite generator may be a commercially available electrolytic hypochlorite generator that inputs either microfiltered seawater or the seawater discharge from a particulate strainer to generate sodium hypochlorite. The generator in the specific example is operated in a recirculation mode to increase the final concentration of the sodium hypochlorite being stored between membrane cleanings. Raising the concentration level of the solution reduces the storage volume that must be allocated for this cleaning chemical. This concentrated solution can be injected into the feed side of the filter. As described above, the sodium hypochlorite is diluted as necessary to oxidize organic material adhering to the outside walls of the hollow fibers. Selective dilution allows the concentration to be changed based, for example, on the quality of the input water.

It is important to remove the organic material because it can not only block the filtration process but also serve as a base for the attachment of larger particles. Typically, in applications such as cooling systems that are plagued with organic fouling, the hypochlorite generator is only operated in a "once-through" mode. With the typical process, the "once-through" hypochlorite stream is injected into the coolant stream and then blended with a strained seawater stream to produce a hypochlorite treated stream to control biofouling organisms. Hypochlorite concentrations in the 0.5 to 1 ppm range are typical for a hypochlorite generator operated in the "once-through" mode. However, by recirculating the hypochlorite through the hypochlorite generators, significantly higher hypochlorite concentrations could be used. This is particularly important in filter cleaning applications where high concentration levels may be required. The final concentration level achieved depends on the number of hypochlorite generators, the amount of dilution and the amount of recirculation.

5. Chlorine Neutralization

As described above, sodium hypochlorite is added to the membranes during the cleaning/reconditioning process. It takes a relatively long time for the fiber membranes to release all of the hypochlorite absorbed during cleaning. Minute (for example, less than 0.2 ppm) levels of hypochlorite could remain. If hypochlorite remains in the filtrate stream, and is detrimental, it may be neutralized by injecting an acidic compound to the filtered water. This acid compound may be similar to Vitamin C. Vita-D-Chlor™ is a commercially available example.

EXAMPLES

The proposed method will now be described in more detail by ways of examples.

Comparative Example 1

Figure 3:
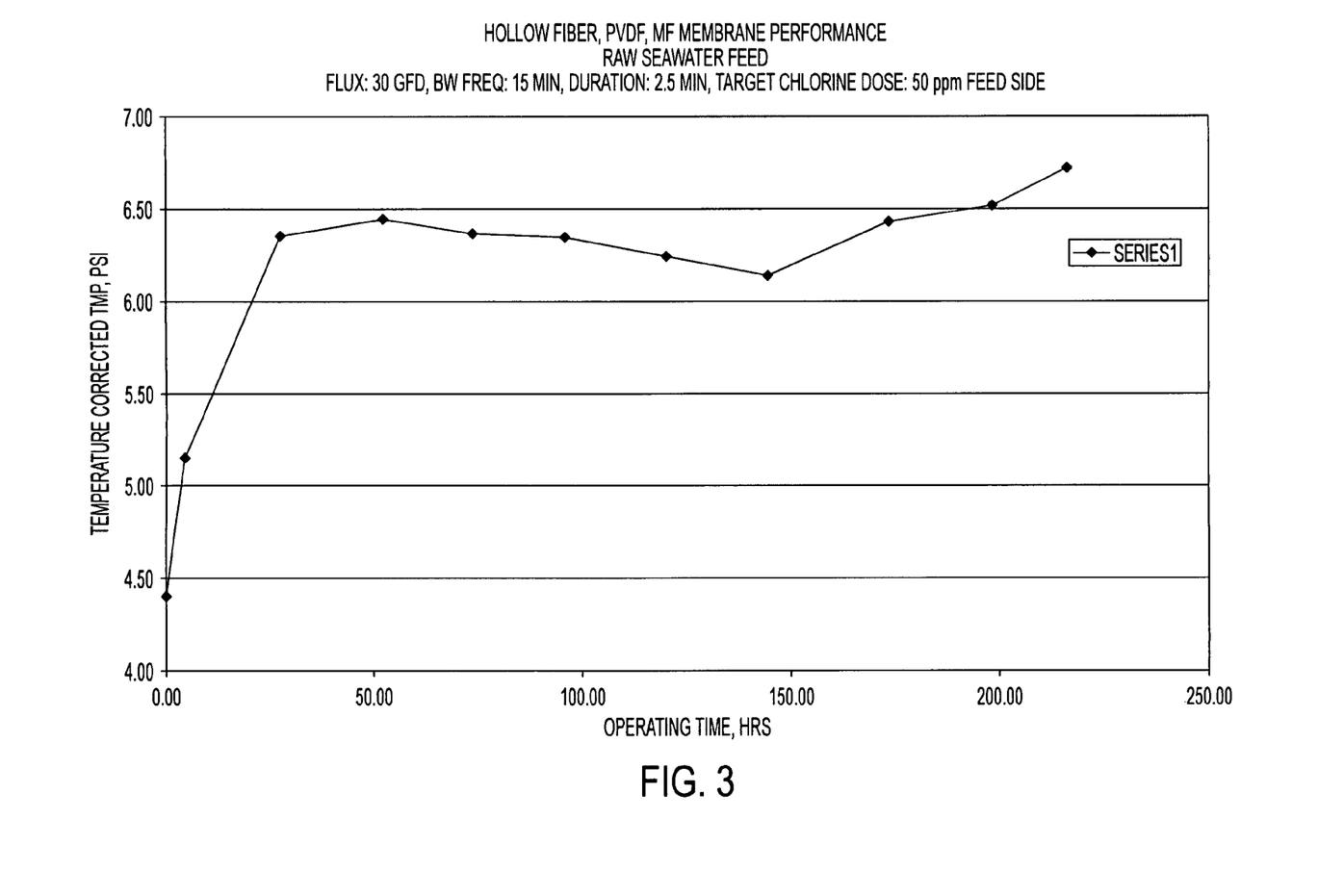
FIG. 3 is a pressure vs. time graph for comparative example 1.

Commercially available PVDF hollow fiber membrane modules were used to filter coastal seawater from the harbor in Port Hueneme, Calif. Each membrane module had over 9,000 hollow fibers that provided approximately 23 square meters or over 250 square feet of surface area for filtering. This surface area was configured in a cylindrical bundle approximately 45 inches long and 4.5 inches in diameter. The flow direction for each module bundle was from the outside surface of each hollow fiber to its inner diameter. The modules were designed for filtering out entrained particles down to the sub micron level. The membrane modules were configured into a bank of three modules. The bank was cycled through filtering and cleaning processes. During the filtering process, a seawater flux rate of thirty-gallons per square foot of fiber surface area per day (GFD) was supplied to each module in the bank. The filtering cycle for the module lasted fifteen minutes. After each filtering cycle, the membrane module was subjected to a 2.5 minute multi-step cleaning cycle. During a portion of this 2.5 minute cleaning cycle, sodium hypochlorite having a 50 ppm hypochlorite concentration was backwashed through the membrane. The cleaning cycle included steps for injecting hypochlorite into the outlet side of the membrane (10 sec), recirculation of the treated filtrate (21 sec), a module soak (18 sec) and finally a shell side recirculation (36 sec). The total residence time for the treated filtrate in the module was approximately 75 seconds with the strongest concentration of hypochlorite applied to the outlet side of the membranes. The membrane module was repeatedly cycled through the filtering and cleaning processes. During each filtering cycle, the pressure drop across the membrane required to maintain the 30 GFD flux rate was calculated from inlet and outlet pressure measurements. The differential pressure drop or trans-membrane Pressure (TMP) was used as a metric to determine the extent to which the membrane was becoming clogged or alternately the effectiveness of the cleaning cycle. FIG. 3 shows a plot of the temperature-corrected pressure drop across the membrane (TMP) in PSI versus the elapsed operating time. As can be seen, the membrane module operated for 216.07 hours. The test was terminated at that point. The final temperature corrected operating pressure for the membrane was 6.91 PSI.

Comparative Example 2

Figure 4:
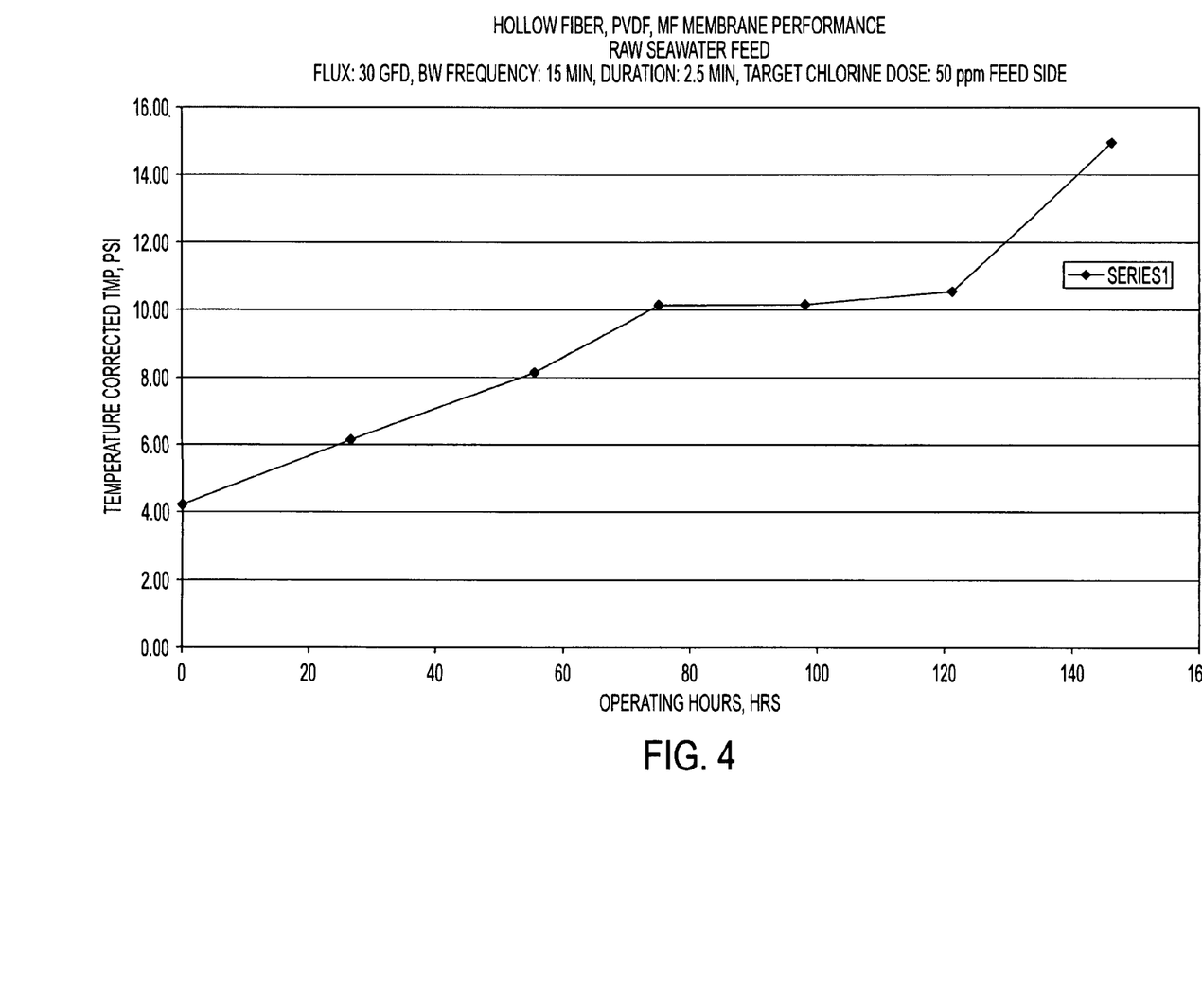
FIG. 4 is a pressure vs. time graph for comparative example 2.

In this comparative example, the same membrane module was cycled through the cleaning and operational phases described above with regard to comparative example 1. However, during the course of this test the, the membranes became rapidly clogged. This rapid clogging of the membranes was attributed to a major shift in feed water quality due to the appearance of a Red Tide, an algae bloom, at Port Hueneme. The large influx of organic contaminants severely loaded the membranes overwhelmed the 2.5 minute cleaning cycle. FIG. 4 shows a plot of the temperature corrected pressure for comparative example 2. As can be seen, the modules became fouled after only 146.15 hours of operation. The last successful inlet temperature corrected pressure was approximately 16.1 PSI.

Comparative Example 3

Figure 5:
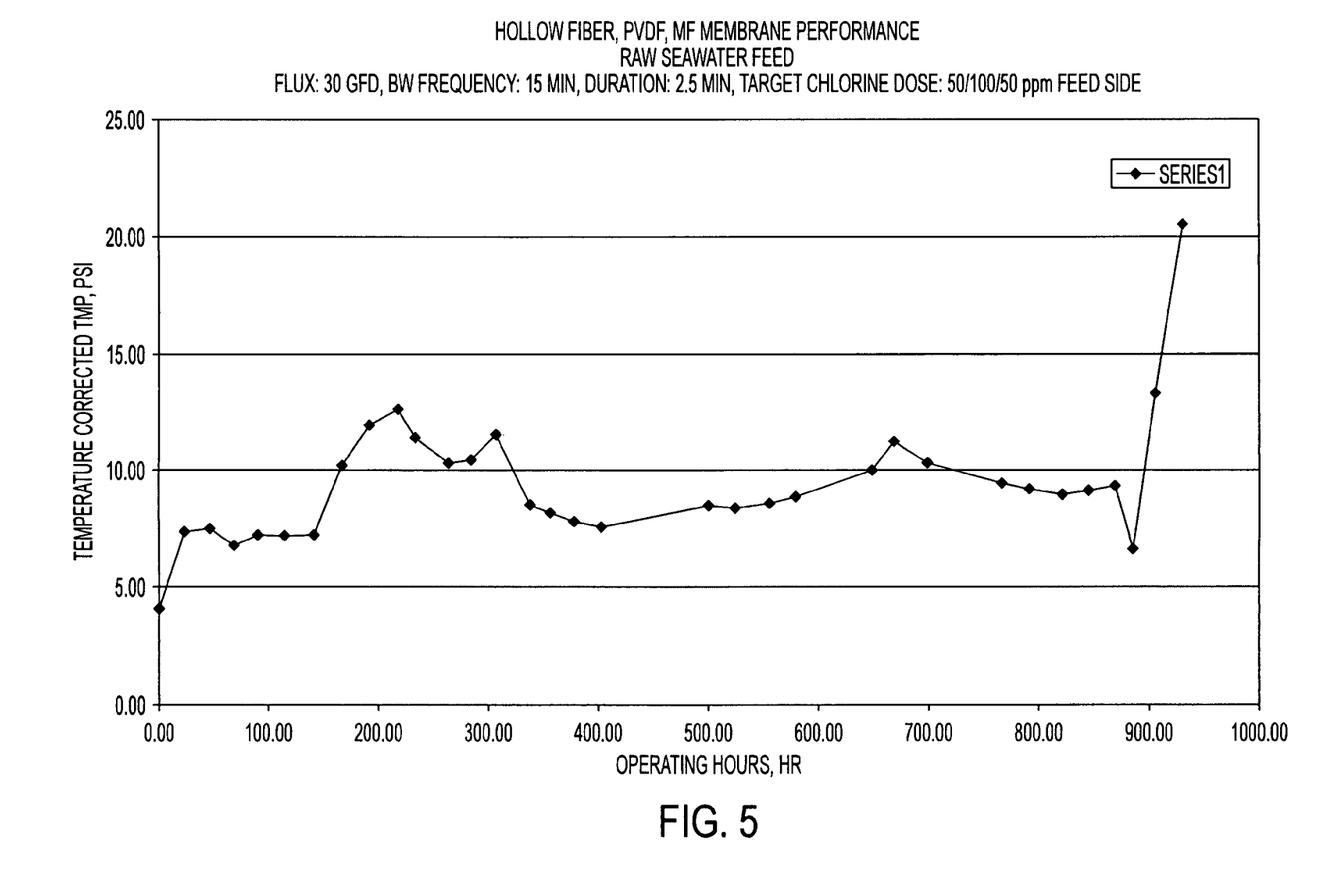
FIG. 5 is a pressure vs. time graph for comparative example 3.

A set of hollow fiber membrane modules was subjected to the same test conditions used for comparative example 1 except that the injection point for the hypochlorite was shifted from the product outlet piping to the raw water inlet piping. When the physical change was implemented, the TMP had already climbed to 12.73 psi. With the new injection and a minor change in the backwash steps the TMP dropped to 9.37 psi. FIG. 5 shows a plot of the temperature corrected pressure drop for comparative example 3. As can be seen, the modules were showing fairly rapid signs of fouling up to the time the hypochlorite injection point was changed. Once the injection point was changed the modules continued to operate for a total time of 930 hours at which point the TMP was 22.82 and further testing was halted to prevent permanent damage to the membranes. One perturbation to the data associated with this run was a change in the hypochlorite concentration used in the injection step. The initial concentration was 50 ppm. After the injection point was changed the hypochlorite concentration was increased to 100 ppm

Test Example 1

Figure 6:
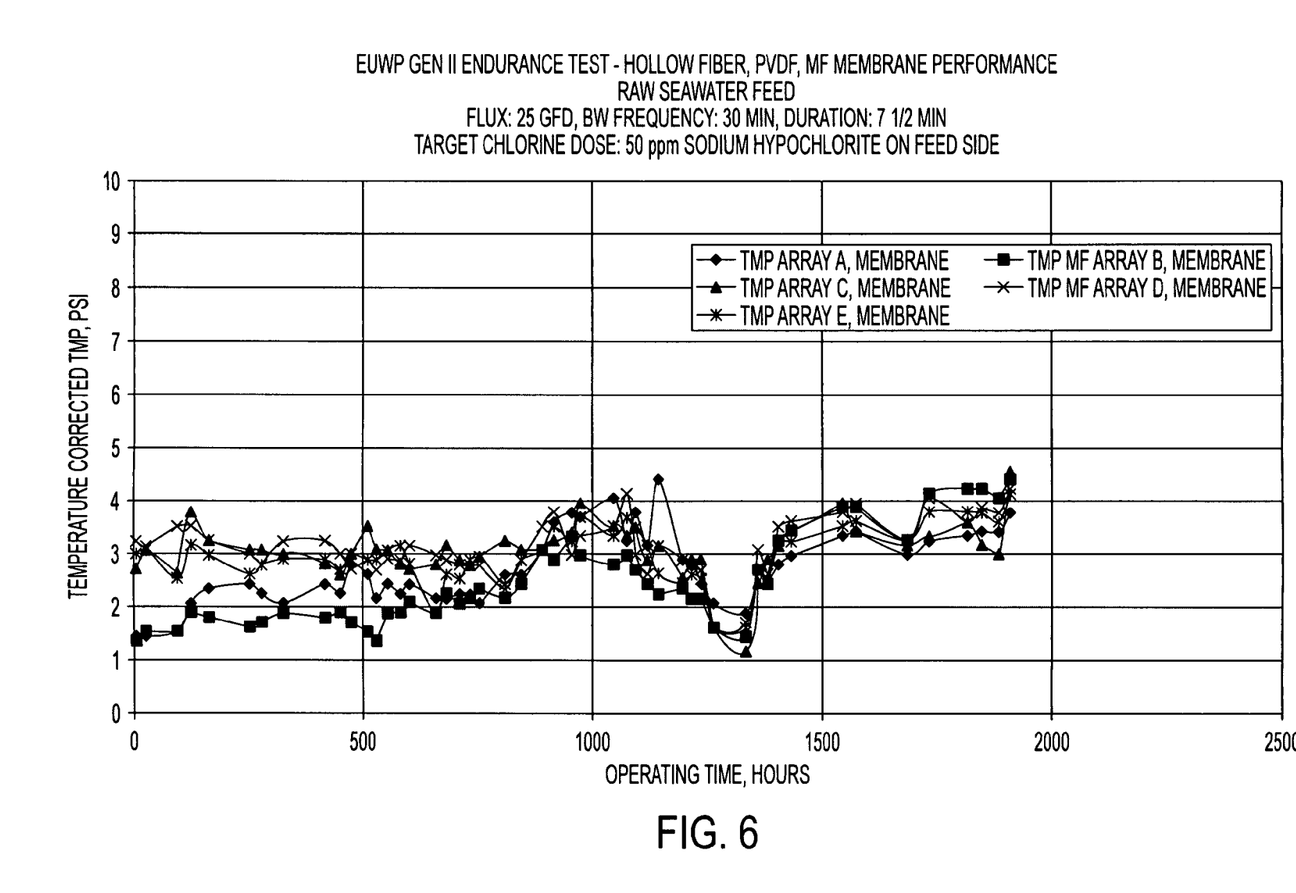
FIG. 6 is a pressure vs. time graph for test example 1.

Test Example 1 was performed on five banks of membrane modules with 16 modules in each bank. Hydraulically all five banks were operated in parallel with each bank being subjected to the same source pressure. Each bank of membrane modules was cycled through the same filtering and cleaning phases such that at any given time, one bank of modules was being cleaned while the other four banks of modules were filtering. The filtering cycle lasted 30 minutes. While filtering, coastal seawater from Port Hueneme, Calif. was supplied to each membrane module at a flow rate of 25 gallons per square feet fiber area per day. After every thirty minutes of operation, a bank of membrane modules was cleaned in a 7.5 minute cleaning cycle. This cleaning cycle used sodium hypochlorite having a hypochlorite concentration of 50 ppm. During the cleaning cycle, the inlet side of the membrane modules was allowed to soak in sodium hypochlorite for seventy seconds. The outlet side of the membranes was subjected to another soak for an additional 30 seconds. FIG. 6 shows a plot of the temperature corrected TMP pressure drop versus operating time. In FIG. 6, each of the five membrane banks of modules is plotted.

In the comparative examples, each of the membrane modules became unusably clogged after a short time, with 930.2 hours being the best run time. After becoming unusably clogged, a manual clean in place involving two days of cleaning with acid and chlorine was necessary before reusing the membrane module. On the other hand, test example 1 was run for over 1800 hours with no significant change in TMP. Test example 1 was concluded before any of the membrane banks exhibited any significant clogging or fouling.

In comparative examples 1 through 3, the input pressure required to maintain a 30 GFD flow rate continually increased due to the increase in TMP as the membranes fouled. Comparative example 1 had the lowest terminal inlet pressure of 6.91 PSI. However, this increase pressure occurred after only 216.1 hours of operation—indicating that this method was ineffective. On the other hand, in test example 1, even though the membranes were operated for 1800 hours, the required inlet pressure stayed below 5 PSI.

As described above, the proposed method may have many advantages over known cleaning methods. These potential advantages include a) reduction or elimination of major cleanings, b) longer filter life, c) minimal chlorine contamination of filtrate, d) minimum waste of product water due to cleaning, and e) minimum contamination of the environment with chlorine.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

What is claimed is:

1. A method, comprising:
   providing a plurality of filters in parallel, each filter having an inlet side and an outlet side separated by a filter barrier;
   in an operational phase, filtering water using a plurality of the filters, the water being filtered by passing the water through the filter, from the inlet side to the outlet side;
   in a cleaning phase, cleaning at least one of the filters while the other filters are filtering water in the operational phase, each filter being cleaned by a cleaning process comprising:
      supplying sodium hypochlorite only to the inlet side of the filter when the filter is off-line, the sodium hypochlorite being supplied such that only the inlet side of the filter is soaked in the sodium hypochlorite in a soaking process, without the sodium hypochlorite being pressurized through the filter during the soaking process, the sodium hypochlorite being allowed to soak for a soak time of at least 30 seconds to oxidize organic contaminates near the surface of the filter, such that during the soak time, substantially no sodium hypochlorite is present on the outlet side of the filter;
      monitoring at least one of a pressure drop across the filter and a quality of inlet water; and
      adjusting a dilution ratio of the sodium hypochlorite based on at least one of the pressure drop across the filter and the quality of the inlet water; and
   cycling the filters through the cleaning phase such that each filter is repeatedly cleaned while other filters are filtering in the operational phase.

2. The method of claim 1, wherein soaking in sodium hypochlorite is employed in every cleaning phase.

3. The method of claim 1, wherein filter cleaning methods comprising rinsing, forward flushing, scrubbing and back flushing are used in conjunction with soaking in sodium hypochlorite so as to remove particulates and oxidize organic matter from the filter.

4. The method of claim 1, further comprising:
   storing highly concentrated sodium hypochlorite; and
   before the sodium hypochlorite is supplied to the inlet side of the filter,
      diluting the highly concentrated sodium hypochlorite solution according to the adjusted dilution ratio.

5. The method of claim 1, wherein
   back flushing is performed for a total time of 10 to 90 seconds per cleaning phase.

6. The method of claim 1, wherein the sodium hypochlorite has a concentration of from 10 ppm to 120 ppm.

7. The method of claim 1, wherein the inlet side is allowed to soak in sodium hypochlorite for 30 to 150 seconds during the cleaning phase.

8. The method of claim 1, wherein the operational phase lasts from 15 to 40 minutes.

9. The method of claim 1, further comprising using the filter in a process that generates fresh water from seawater.

10. The method of claim 1, further comprising generating the sodium hypochlorite from seawater.

11. The method according to claim 10,
   wherein the method further comprises:
      using the filter in a desalination process that generates fresh water from seawater; and
      generating the sodium hypochlorite from seawater, and
   wherein eliminating particulates, performing desalination, generating sodium hypochlorite and using sodium hypochlorite are all performed in a self-contained unit.

12. The method of claim 1, wherein the filter is a hollow fiber membrane.

13. The method of claim 1, wherein at least one filter cleaning method selected from the group consisting of rinsing, forward flushing, scrubbing and back flushing are used in conjunction with soaking in sodium hypochlorite so as to remove particulates and oxidized organic mater from the filter.

14. The method of claim 1, wherein the filter, being soaked with sodium hypochlorite on the inlet side, is drained on the outlet side.

15. The method of claim 1, wherein the sodium hypochlorite is electrolytically generated from sea water.

16. The method of claim 1, wherein the sodium hypochlorite is used in conjunction with a bromide disinfectant.

17. The method of claim 1, wherein the sodium hypochlorite is supplied in an amount such that substantially all of the sodium hypochlorite is consumed during soaking.

* * * * *